(12) United States Patent
Schautt et al.

(10) Patent No.: US 9,145,282 B2
(45) Date of Patent: Sep. 29, 2015

(54) FRICTION BRAKE HAVING AN ACTUATOR UNIT THAT ACTS PERPENDICULARLY TO THE BRAKE APPLICATION DIRECTION

(75) Inventors: Martin Schautt, Munich (DE); Michael Ries, Olching (DE)

(73) Assignee: RG MECHATRONICS GMBH, Seefeld (DE)

( * ) Notice: Subject to any disclaimer, the term of this patent is extended or adjusted under 35 U.S.C. 154(b) by 44 days.

(21) Appl. No.: 14/342,085

(22) PCT Filed: Aug. 31, 2012

(86) PCT No.: PCT/EP2012/066974
§ 371 (c)(1),
(2), (4) Date: Jun. 9, 2014

(87) PCT Pub. No.: WO2013/030347
PCT Pub. Date: Mar. 7, 2013

(65) Prior Publication Data
US 2014/0299425 A1    Oct. 9, 2014

(30) Foreign Application Priority Data

Aug. 31, 2011 (DE) .......... 10 2011 053 178

(51) Int. Cl.
*F16D 55/224* (2006.01)
*B66D 5/02* (2006.01)
*B66B 5/18* (2006.01)
*F16D 63/00* (2006.01)
(Continued)

(52) U.S. Cl.
CPC .. *B66D 5/02* (2013.01); *B61H 7/12* (2013.01); *B66B 5/18* (2013.01); *F16D 55/2245* (2013.01); *F16D 63/008* (2013.01); *F16D 65/0068* (2013.01); *B66B 5/22* (2013.01); *F16D 55/224* (2013.01); *F16D 2125/66* (2013.01)

(58) Field of Classification Search
CPC .............. B66B 5/22; B66B 5/18; B61H 7/12; F16D 55/2245; F16D 63/008; F16D 2125/66; F16D 55/224
USPC .............................. 188/72.7, 343, 43, 44, 136
See application file for complete search history.

(56) References Cited

U.S. PATENT DOCUMENTS 5,014,828 A * 5/1991 Baldassarre .................. 188/173
5,819,879 A * 10/1998 Lang et al. .................... 187/376
(Continued)

FOREIGN PATENT DOCUMENTS

| CH | 684190 A5 | 7/1994 |
|---|---|---|
| DE | 2838423 A1 | 3/1980 |

(Continued)

OTHER PUBLICATIONS

International Search Report No. PCT/EP2012/066974 dated Feb. 26, 2013.

*Primary Examiner* — Thomas Irvin
(74) *Attorney, Agent, or Firm* — Carter, Deluca, Farrell & Schmidt LLP

(57) ABSTRACT

The invention relates to a friction brake (1), in particular for elevators, comprising at least two pivotally mounted brake levers (2), which each have a brake lining (6) and are arranged opposite each other in the form of a brake caliper. An actuator (5) is provided for actuating the friction brake (1). In order to avoid uneven loading of the opposing brake levers (2), the actuator (5) is designed in such a way that the force ($F_A$) exerted by the actuator (5) acts substantially perpendicularly to a brake application force ($F_Z$) exerted by the brake levers (5). Furthermore, a spreading mechanism (9, 26) is provided, by means of which the brake application force ($F_Z$) can be regulated by the force ($F_A$) exerted by the actuator.

14 Claims, 5 Drawing Sheets

(51) Int. Cl.
  *B61H 7/12* (2006.01)
  *F16D 65/00* (2006.01)
  *B66B 5/22* (2006.01)
  *F16D 125/66* (2012.01)

(56) References Cited

U.S. PATENT DOCUMENTS

| | | | |
|---|---|---|---|
| 6,318,505 B1 * | 11/2001 | De Angelis | 187/292 |
| 6,722,477 B1 * | 4/2004 | Wolfsteiner et al. | 188/72.9 |
| 6,802,402 B2 * | 10/2004 | Bausch et al. | 188/171 |
| 7,124,861 B2 * | 10/2006 | Maher | 188/72.7 |
| 7,575,099 B2 * | 8/2009 | Oh et al. | 187/286 |
| 7,975,811 B2 * | 7/2011 | Berliant | 188/43 |
| 8,783,424 B2 * | 7/2014 | Chen et al. | 188/72.7 |
| 2013/0140112 A1 * | 6/2013 | Walter et al. | 188/58 |
| 2014/0041971 A1 * | 2/2014 | Hujer | 188/72.7 |
| 2014/0326547 A1 * | 11/2014 | Yano et al. | 188/72.2 |

FOREIGN PATENT DOCUMENTS

| | | | | |
|---|---|---|---|---|
| DE | 19945703 A1 * | 4/2001 | | F16D 65/21 |
| DE | 102005053835 A1 | 5/2007 | | |

* cited by examiner

State of the Art

State of the Art

FRICTION BRAKE HAVING AN ACTUATOR UNIT THAT ACTS PERPENDICULARLY TO THE BRAKE APPLICATION DIRECTION

The invention relates to a friction brake, in particular for elevators, comprising at least two brake levers that each have a brake lining and are arranged opposite each other in the form of a caliper, wherein at least one brake lever is pivotally mounted, and an actuator for actuating the brake levers.

Friction brakes that are known from the prior art, which are formed in the manner of a brake caliper, such as may also be used for the braking of elevators, comprise two brake levers arranged opposite each other, which are pushed against an element located in between them, for example a brake disc, by means of an actuator, for example an electric motor. The actuators of such friction brakes are often constructed in accordance with the principle of an anchoring slide. The electric motor is thus typically fastened to one of the brake levers. The electric motor drives a spindle to actuate the brakes, said spindle being mounted for rotation on the other brake lever.

Figure 1:
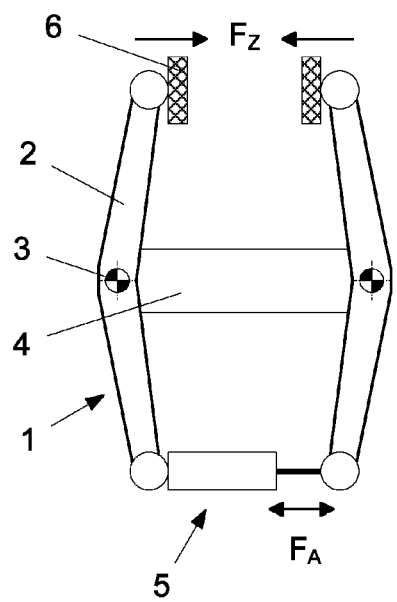

FIG. 1 shows a friction brake 1 known from the prior art, having two brake levers 2 arranged opposite each other, each of which are centrally pivoted. A brake lining 6 is provided at one end of the brake lever 2. An actuator 5—in the present case an electric motor—is arranged at the other end of the brake lever 2, by means of which the lever ends can be moved apart or towards each other. The operating direction of the actuator 5 is, in this case, designated by $F_A$. The force exerted by the actuator 5 is deflected by a bearing 3, such that the brake linings 6 move towards or away from each other in the direction of the clamping force $F_Z$. As can be seen, the operating directions (force $F_A$) of the actuator 5 and the clamping force $F_Z$ are parallel.

Figure 2:
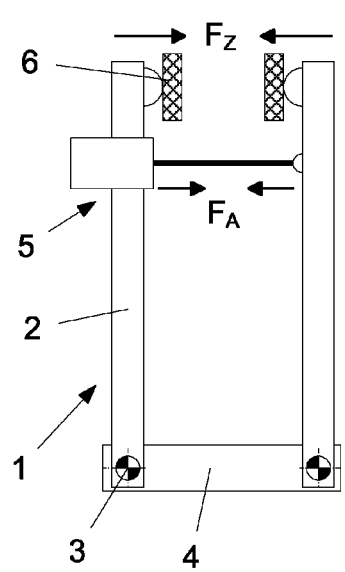

FIG. 2 shows another friction brake known from the prior art, having two brake levers 2 which are both pivoted about one end. A brake lining 6 is provided on the other, free end of the brake levers 2. The brake levers 2 are here arranged opposite each other in the form of a brake caliper, which enclose an element located in between (not shown), such as a disc. The depicted friction brake is acted on by an actuator 5, which is embodied as an anchored slide. The anchored slide comprises, in this case, an electric motor having a spindle unit 7, wherein the electric motor is fastened to one of the brake levers 2 and the spindle unit 7 is fastened to the other brake lever 2. By operating the electric motor, the brake can be either clamped or released in the direction of the clamping force F. The operating direction of the actuator 5 is in turn designated by $F_A$. Here, the operating direction $F_A$ of the actuator 5 and the clamping force $F_Z$ are also parallel.

In the case of the friction brakes described above, the actuator 5 is mounted laterally on one of the brake levers 2. Due to the relatively high force from the weight of the actuator 5, the brake or mounting thereof is loaded on one side. This, on the one hand, generates an undesired moment of inertia is, which can have a negative influence on the braking operation of the brake 1. On the other hand, the weight of the actuator 5 exerts a moment on the brake levers, which slightly twists or bends the brake lever 2, which leads to the brake linings no longer contacting the braking element, such as a guide rail, in a planar manner. This can also negatively influence the braking response and braking performance.

A friction brake having at least two rotationally-mounted brake levers is known from EP 1 067 084 A1, said brake levers having a respective brake lining and being arranged opposite each other in the form of a brake caliper. The friction brake comprises a linear mechanism for operating the brake levers, said mechanism being configured in such a way that the force exerted by the actuator acts substantially perpendicular to the clamping force exerted by the brake levers, and furthermore comprises a spreading mechanism that allows the actuator to regulate the clamping force. A friction brake constructed according to the same principle is also known from DE 10 2005 053 835 A1, CH 684 190 A5 or DE 1 249 606 B. Further friction brakes with different designs are disclosed in documents DE 31 23 640 A1 and DE 29 10 118 A1.

The object of the present invention is therefore to create a friction brake, in particular for elevators, which has an improved braking response and as consistent a braking performance as possible.

This object is solved according to the invention by the features specified in claim 1. Further embodiments of the invention arise from the dependent claims.

According to the invention, a friction brake, in particular for elevators, is proposed, which comprises at least two brake levers that each have a brake lining and are arranged opposite each other in the form of a brake caliper, wherein at least one brake lever is mounted for rotation. The actuator of the friction brake according to the invention is, in this case, configured in such a way that the force exerted by the actuator acts substantially perpendicular to a clamping force exerted by the brake levers. Moreover, the friction brake according to the invention comprises a spreading mechanism having a roller unit that is acted on by the actuator, having a first roller that rolls on a first surface provided on the first brake lever, and a second roller that rolls on a second surface provided on the second brake lever, wherein the rollers rotate around the same axis. Such a construction can both improve the braking performance and achieve highly consistent braking operation with low levels of wear.

According to a preferred embodiment of the invention, the actuator is not mounted on one of the brake levers, but rather on a carrier element of the brake caliper on which the brake levers are also mounted, for example, or on any other carrier. In the case of an elevator brake, the actuator can be fastened to a part of the elevator frame, for example.

The actuator preferably extends at least partially into the region between the opposing brake levers. The operating direction of the actuator thus preferably runs in the longitudinal direction of the brake levers, i.e. from the bearing to the brake lining.

The spreading mechanism according to the invention preferably comprises a roller unit that rolls on at least one wedge surface. The roller unit is preferably driven by the actuator in its operating direction.

The spreading mechanism is preferably arranged between the brake levers. According to a first embodiment, the spreading mechanism can comprise, for example, a wedge element provided on one of the brake levers, and a flat contact surface provided on the other brake lever. A wedge element can optionally be provided on each brake lever. The wedge surfaces of the wedge elements are then preferably identical.

A wedge surface can either have a constant or a varying slope. The wedge shape can, for example in a first region on which the roller unit rolls, where the brake linings do not yet lie on the braking element, have a greater slope than in a second region on which the roller unit rolls, where the brake linings press against the braking element. The clamping response of the brake can, in principle, be influenced by the design of the wedge surface and/or by the control of the actuator. The actuator could, for example in a specific phase of a braking procedure, be operated more quickly than in another phase of the braking procedure.

The at least one wedge element of the spreading mechanism is preferably fastened to the corresponding brake lever. The brake lever and the wedge element can also be formed as a single unit.

According to a preferred embodiment of the invention, the actuator comprises a drive system, such as an electric motor, a nut-and-screw unit and a roller unit that can be moved by driving the spindle in the operating direction of the actuator. This construction is particularly simple and cost-effective to implement.

According to a specific embodiment of the invention, at least one of the brake levers, preferably both brake levers, are mounted for rotation by means of a solid state hinge. The solid state hinge can have, for example, one or more struts, to which a respective brake lever is fastened. The strut is then twisted during a rotational movement of the brake lever.

The friction brake according to the invention preferably comprises a clamping device, in particular a spring arrangement, which clamps the brake levers in the clamping direction and is preferably capable of closing the brake automatically.

Clamping motion driven by the spring arrangement is preferably regulated by the actuator at least at certain times. In this way, the clamping force of the spring arrangement can, on the one hand, be variably adjusted. On the other hand, the clamping motion can be damped. The actuator is preferably controlled in such a way that the brake lining or linings is/are applied to the braking element at a lower speed than without the intervention of the actuator. The gentler application of the brake linings thus obtained can contribute to the braking response of the friction brake being further improved.

The friction brake according to the invention serves particularly to brake any kind of transportation device. The designation "transportation device" is in this case to be understood as any device that can be moved along a fixed track, such as a guide rail. Here, what is meant is, in particular, all equipment that is suitable for transporting people or goods, whether horizontally or vertically, and in particular elevators, elevator cages, conveyor units, paternosters, drive cables, lifting platforms, ship lifts, etc.

The friction brake actuator is preferably designed to be non-self-locking, such that the friction brake, in the case of a defect such as a loss of power, can close automatically. Friction brakes having an electric motor as an actuator and an additional clamping device such as the aforementioned spring arrangement operate as follows, for example, when a fault occurs: when there is a loss of power, the electric motor can no longer hold the clamping force exerted by the clamping device. The brake levers then move into the clamped position under the influence of the clamping device. The transportation devices are thus automatically braked and are ultimately held stationary.

According to a specific embodiment of the invention, an overrun brake is also provided, which automatically brakes the rotational movement of the actuator when the roller unit driven by the actuator reaches a stop. Such an overrun brake has the advantage that the rotational kinetic energy of the motor is absorbed and so can also prevent damage to the mechanical structure of the friction brake.

The overrun brake can, for example, comprise a lining holder, to which a brake lining is attached, fastened to a spindle and a fixture fastened to a brake lever, against which the brake lining presses.

According to a specific embodiment of the invention, the friction brake comprises a lining guide arranged between the brake levers, said lining guide adjusting the gap between the brake linings and the braking element located there between. The lining guide is preferably suspended elastically, such that the clearance between the opposing brake linings and the guide rail is equal on both sides and the brake is centered. The lining guide can, for example, comprise one or more sliders that can, for example, be mounted elastically. In the case of an elastic mounting, the mounting is preferably stiffer in the normal operating range than when the brake levers are only pre-loaded.

Figure 3:
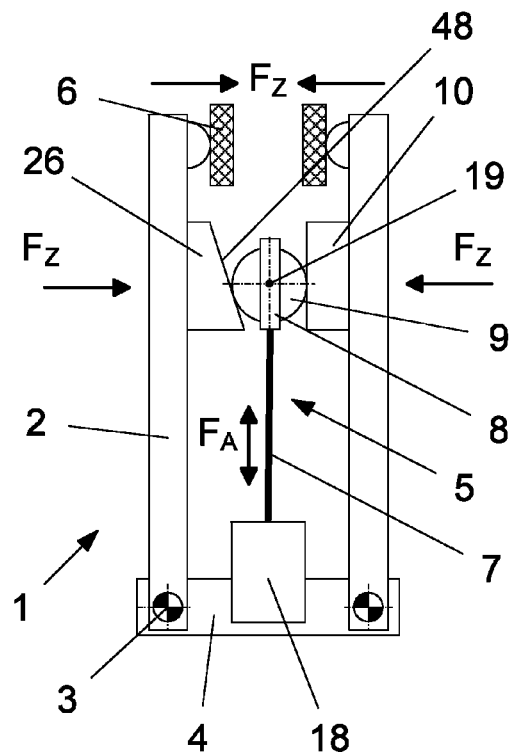
Figure 4:
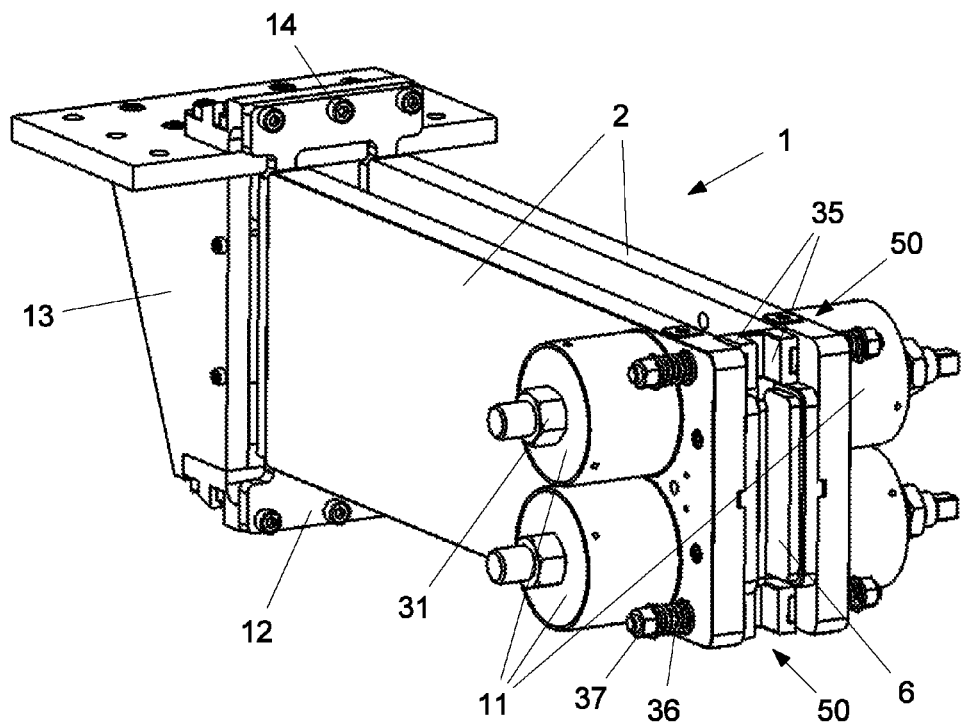
Figure 5:
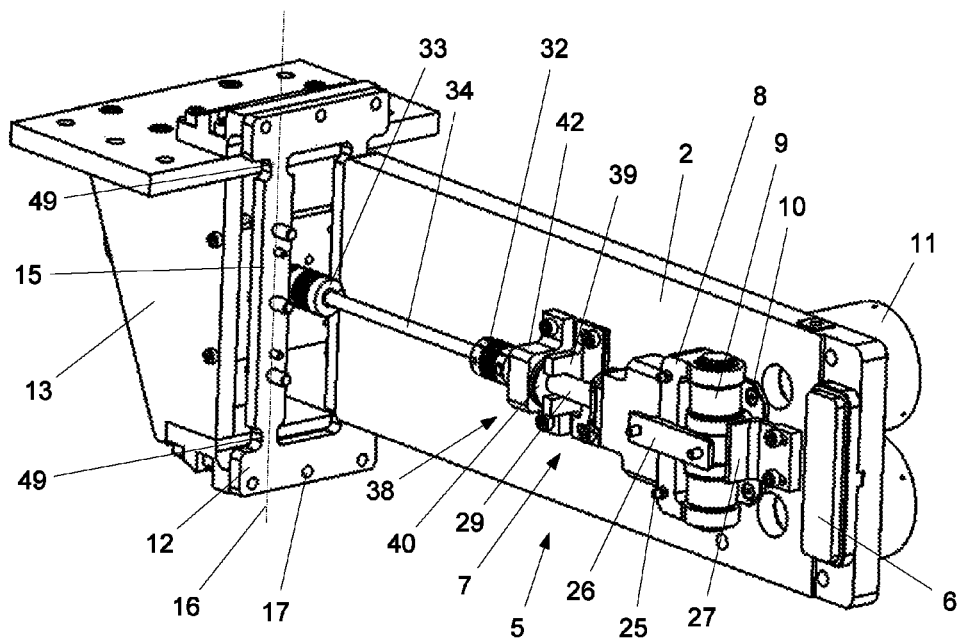
Figure 6:
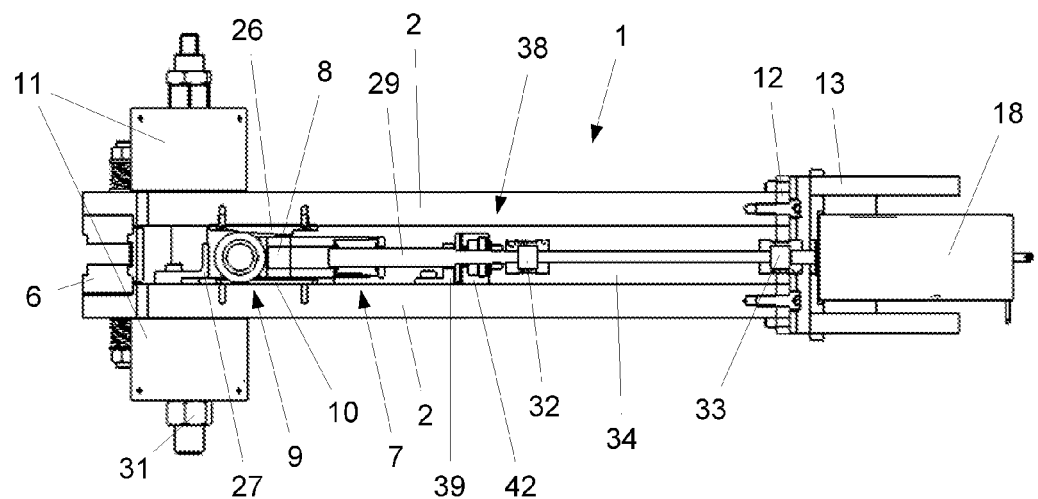
Figure 7:
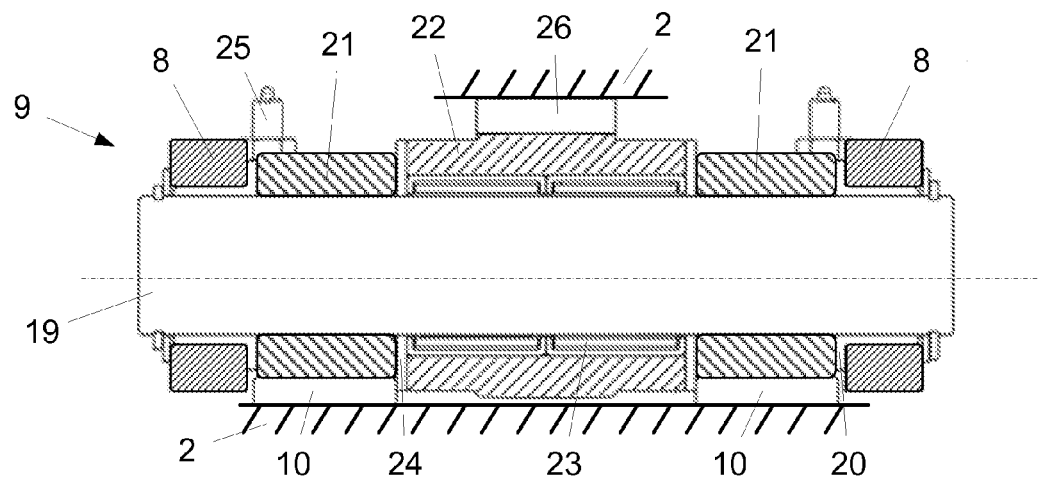
Figure 8:
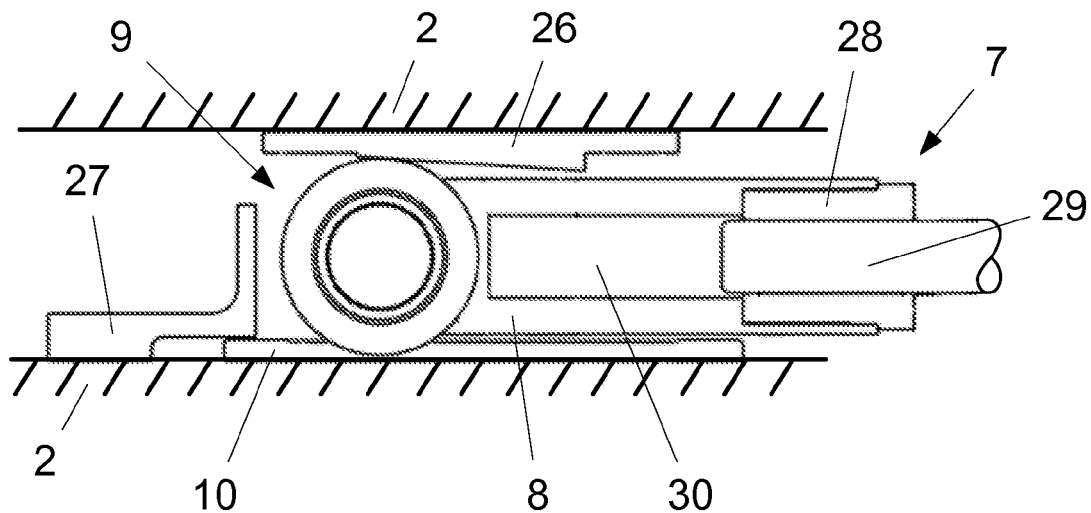
Figure 9:
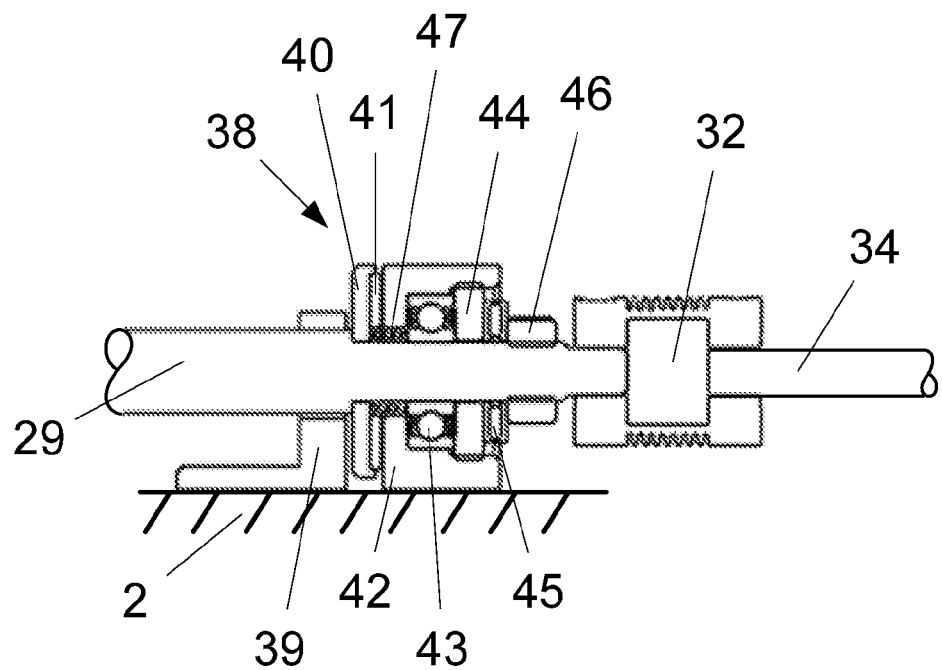

The invention is illustrated in greater detail below with the aid of the appended drawings by way of example. Here are shown:

FIG. 1 a friction brake known from the prior art, having two brake levers;

FIG. 2 another friction brake known from the prior art, having two brake levers;

FIG. 3 a schematic diagram of a friction brake according to the invention;

FIG. 4 a lateral, perspective view of a friction brake according to a preferred embodiment of the invention;

FIG. 5 an interior view of the friction brake from FIG. 4;

FIG. 6 a top view of the friction brake depicted in FIG. 4;

FIG. 7 an enlarged, detailed view of a roller unit of the friction brake from FIG. 4;

FIG. 8 a lateral view of the roller unit from FIG. 7;

FIG. 9 an enlarged, detailed view of an overrun brake; and

Figure 10:
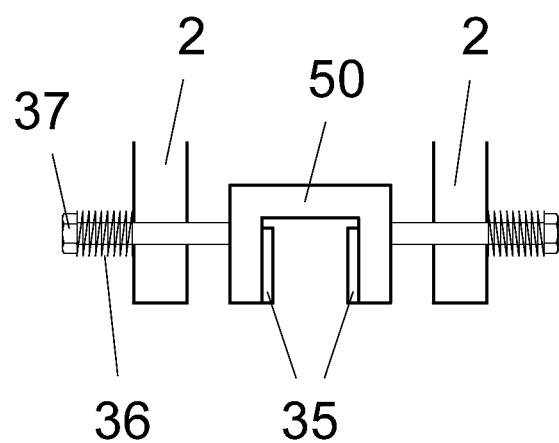

FIG. 10 a detailed view of a lining guide.

EMBODIMENTS OF THE INVENTION

With respect to FIGS. 1 and 2, reference is made to the introduction to the description.

FIG. 3 shows a schematic diagram of a friction brake 1 having two brake levers 2 pivotally mounted, which are arranged opposite each other in the form of a brake caliper. The brake levers 2 each comprise a brake lining 6 at their free end, said brake lining being able to be pushed against or released from a braking element (not shown), such as for example a rail, by actuation of the brake 1. The brake linings 6 are preferably so fastened on the brake levers 2 that they may be exchanged. The brake levers 2 are pivotally mounted on their opposite end. The corresponding bearings 3 are provided on a carrier element 4 that extends between both brake levers 2.

The friction brake 1 is acted on by an actuator 5, which in this case comprises an electric motor 18 and a nut-and-screw unit 7 that functions as a rotation/translation conversion gear. The actuator 5 or the electric motor 18 is preferably fastened to a rigid part of the friction brake 1, such as the carrier element 4 or a part of the frame 13 that does not belong to the brake, said part serving to connect the entire friction brake 1.

A roller unit 9 mounted in a slide 8 is in turn driven by the translational movement of the nut-and-screw unit 7. A rotational movement of the electric motor 18 is consequently converted into a linear movement of the roller unit 9, wherein the slide 8, which engages on the spindle via a gear or nut, is moved in the direction of the arrow $F_A$ (up and down in FIG. 3).

The roller unit 9 with the slide 8 is a component of a spreading mechanism, with which the force $F_A$ exerted by the actuator 5 is used to push the brake levers 2 in the opposite direction to the clamping force $F_Z$. Thus, the actuator 5, together with the spreading mechanism, is arranged in such a way that the direction of the actuator force $F_A$ and the that of the clamping force $F_Z$ resulting from the spring assembly 11 are substantially perpendicular (in contrast with the prior art shown in FIGS. 1 and 2, wherein the directions of the actuator and clamping forces are substantially parallel).

In addition to the roller unit 9, the spreading mechanism 9, 26 comprises at least one wedge element 26 that is mounted rigidly to one of the brake levers 2 in the present example. The wedge element 26 has a wedge surface 48, on which the roller unit 9 rolls during the operation of the friction brake 1. A plate-like guide element 10 is provided on the opposite side, which is in turn connected rigidly to the other brake lever 2. The normal vector to the surface of the guide element 10, on which the roller unit 9 rolls, is substantially perpendicular to the operating direction $F_A$ of the actuator 5. The guide element 10 thus provides no contribution to the spreading of the brake levers when the roller unit 9 is driven by the electric motor 18.

Alternatively, the incline of the wedge element 26 may vary to produce a non-linear wedge profile.

The friction brake 1 moreover comprises a clamping device that is depicted in greater detail in FIG. 4—in the present example a spring arrangement 11—which clamps the brake levers 2 in the clamping direction and is preferably capable of closing the brake automatically.

The friction brake 1 depicted in FIG. 3 in principle operates as follows: the brake 1 is pre-loaded with a predetermined force by the spring arrangement 11 depicted in FIG. 4. To carry out a braking procedure, the slide 8 is moved by means of the actuator 5 in such a way that the roller unit 9 rolls downwards along the wedge surface 48 of the wedge element 26 (upwards in FIG. 3). The distance between both brake levers 2 is thereby reduced, wherein the brake levers 2 are pressed together due to the pre-loaded spring arrangement 11. The brake linings 6 move towards each other and are applied to the braking element (not shown). The clamping motion driven by the clamping device 11 is thus damped by the actuator 5. In order to reopen the friction brake 1, the actuator 5 is driven to the reverse position. Thus, the roller unit 9 rolls upwards along the wedge surface 48 (the slide 8 therefore moves downwards in FIG. 3), such that both brake levers 2 are spread apart from each other against the force of the spring arrangement 11.

The spreading mechanism could alternatively also have two wedge elements 26—one per brake lever 2. The wedge surface of the wedge element(s) 26 could also rise in the opposite direction. In this case, the actuator 5 would have to be actuated in an opposing manner.

According to a preferred embodiment of the invention, the clamping device 11 and the actuator 5 are configured in such a way that the friction brake 1 closes automatically in the case of a defect such as a loss of power. The elastic force exerted by the spring arrangement 11 is, in this case, large enough for the wedge mechanism 9, 26 to be able to move the slide 8 in its clamping direction (upwards in FIG. 3). The nut-spindle-unit 7 is, for this purpose, configured to be non-self-locking.

FIG. 4 shows a perspective side view of a friction brake 1 according to a preferred embodiment of the invention. Here, the spring unit 11, which pre-loads the brake with a high level of force in the clamping direction, can clearly be seen. Here, the spring unit 11 comprises several spring assemblies that are each arranged on the exterior of the brake levers 2 and are supported on one side by the corresponding brake lever and on the other side by a locking nut 31. In the embodiment depicted in FIG. 4, two respective spring units are arranged on a threaded rod that extends transversely through the brake levers 2 substantially in the clamping direction (in the direction of the clamping force $F_Z$). The spring units 11 are each secured on the outside by a nut 31. The elastic force of the spring units 11 can be adjusted by means of the nuts 31.

FIG. 5 shows an interior view of the friction brake from FIG. 4, wherein the actuator 5 and the roller unit 9 can in particular be easily seen, and moreover a solid state hinge 12, by means of which the brake levers 2 are mounted for rotation.

In this case, the solid state hinge is a component having two struts 15, to each of which one of the brake levers 2 is fastened. The struts 15 are in principle formed as self-supporting, narrow bars, which, due to their small cross-section, in particular in the tapered regions 49, can be twisted. The solid state hinge 12, including the struts 15, can be produced from metal, for example.

If the brake levers 2 are rotated in the clamping or release direction $F_Z$, the struts 15 twist around their longitudinal axis 16. In so doing, an internal stress builds up in the solid state hinge, the said stress acting like a spring and attempting to return the brake levers 2 to their starting positions. The solid state hinge and the struts 15 are preferably configured in such a way that they do not exert any force onto the brake levers 2 in the open position of the friction brake 1. However, they may alternatively also be configured in such a way that they pre-load the brake levers 2 in order to move the latter into the open position. Several screws 14 are provided on a framework part 13 to fasten the solid state hinge 12, said screws being screwed into corresponding tapped holes in the solid state hinge 12.

It can be clearly seen by the person skilled in the art that the functional principle of the brake is then also still provided if only one of the two brake levers is pivotally mounted. In this respect, the brake can alternatively be configured with only one pivoting brake lever and one second, fixed brake lever. It would be preferable for the brake lever on which, for example, the actuator is mounted, to be configured as fixed.

The nut-spindle-unit 7 fundamentally comprises a spindle 29 and a spindle extension 34. The corresponding nut 28, with which the slide 8 can be moved in the longitudinal direction of the spindle 29, is also depicted in greater detail in FIG. 8. In order to permit a certain relative movement or adjustment between the elements—electric motor 18, spindle extension 34 and spindle 29—two bellows couplings 32 and 33 are provided. These can transfer the rotational movement of the electric motor 18 and, at the same time, enable a small axial displacement or a small angular movement of the spindle 29 or the spindle extension 34, in order to compensate for the pivoting motions of the brake levers 2, in particular. Alternatively, universal joints, for example, could also be used.

In a further alternative embodiment of the invention, the motor 18 of the actuator 5 can be mounted directly on the brake levers 2, to which the remaining mountings (e.g. bracket 42) of the actuator 5 are also fastened. Thus, at least one of the bellows couplings 32 and 33 could be dispensed with and the actuator 5 would be positioned entirely between both brake levers 2.

The spindle 29 is moreover restrained radially by means of a bearing in the bracket 42 that is fastened to one of the brake levers 2. The bracket 42 and a radial bearing 43 arranged therein are depicted in detail in FIG. 9, to which reference will be made below.

FIG. 6 shows a top view onto the friction brake 1 depicted in FIG. 4. Here, the nut-spindle-unit 7 and the roller unit 9, in particular, can clearly be identified, positioned between both brake levers 2. As can be seen, the roller unit 9 is supported on one side by the wedge surface 26 and on the other side by the guide element 10. Since the frictional forces acting during the rolling on the opposing roller surfaces of the elements 10, 26 exert an opposing moment onto the roller unit 9, the roller unit 9 would not roll if only a single roller were provided. In this case, the rolling movement would be replaced by a sliding movement that would increase the wear of the roller unit 9 or the spreading mechanism 10, 26. To avoid this, the roller unit 9 preferably comprises several rollers that are arranged in such a way that they can roll in different directions in the case of a longitudinal displacement of the slide 8.

FIG. 7 shows an enlarged view of a preferred roller unit 9 having several rollers 21, 22 that rotate around a common axis. In this case, the roller unit 9 comprises a central roller 22 that rolls on the wedge surface 48 of the wedge element 26, as well as two supporting rollers 21 that are positioned on either side of the roller 22 and roll on the guide element 10. The central roller 22 is mounted for rotation on a shaft 19 via a bearing 23. Both supporting rollers 21 are, however, connected to the shaft 19. The shaft 19 is mounted via a rotational bearing in the slide 8. Since the roller 22 can rotate independently of the supporting rollers 21 as a result of the bearing 23, the rollers 21, 22 can roll in opposite rotational directions in accordance with their respective motion. The roller 22 preferably has a spherical profile. Alternatively, the supporting rollers 21 can also be spherically mounted on the shaft 19.

As can be detected, the central roller 22 has a greater diameter than both supporting rollers 21. In the region of the central roller 22, a depression is provided on the side of the guide elements 10, such that the roller 22 does not come into contact with the brake lever 2. During motion of the roller unit 9 in the longitudinal direction of the nut-spindle-unit 7, the rollers 21 and 22 can thus roll in opposite directions on their respective surfaces.

In order to keep the friction between the individual components of the roller unit 9 at a low level, plain bearings 20 and 24 are provided. The bearings 24 are, in this case, each mounted between two neighboring rollers 21, 22. The sleeve bearings 20 are, on the other hand, positioned between the outer rollers 21 and the slide 8.

In the embodiment depicted here, spring elements 25 are moreover provided, which are supported on a brake lever 2 and press the roller unit 9 against the other brake lever 2. It is thus ensured that the roller unit 9 accurately follows the path along the guide element 10 and the wedge element 26 and does not tilt or slip off the guide.

FIG. 8 shows a lateral view of the roller unit 9 from FIG. 7. Here, the wedge element 26 and the guide element 10 can clearly be seen in the cross-section. Furthermore, FIG. 8 shows the end section of the nut-spindle-unit 7 and the connection thereof to the slide 8. In the present case, the nut 28 is fitted tightly into the slide 8. As was alluded to initially, the spindle 29 is driven by the electric motor 18. The rotational movement of the spindle 29 is thus converted into a linear movement of the nut 28 and the slide 8. The slide 8 has a hollow chamber 30, into which the spindle 29 can move when the slide 8, together with the roller unit 9, rolls up the wedge surface of the wedge element 26 (in FIG. 8, the slide 8 moves to the right in this case).

The friction brake 1 moreover comprises a stop 27 that limits the maximum motion of the roller unit 9 and prevents the roller unit 9 from being displaced further than the end of the wedge element 26 or the guide element 10. The stop 27 can, for example, be mounted on one of the brake levers 2.

Finally, FIG. 9 shows an overrun brake 38, which brakes the rotational movement of the spindle 29 when the nut-spindle-unit 7 is located in its maximum extended position and the roller unit 9 or the slide 8 runs up against the stop 27. As soon as the roller unit 9 is pushed against the stop 27, a further rotational movement leads to the nut-spindle-unit 7 being clamped between the stop 27 and the electric motor 18 and an increasing force acts in the direction of the drive 18. In this case, a friction lining 41, which is mounted on a lining holder 40 fastened on the spindle 29, presses against an element that is mounted rigidly on one of the brake levers 2, such as a bearing bracket 42, having a friction surface facing in the axial direction. Thus, on the one hand, the rotational movement of the spindle is braked and, on the other, the contact force can be supported on the bearing element 42, relieving the load on drive 18.

In the exemplary embodiment depicted, a bearing 43, 45 is integrated into the bearing element 42. A first bearing 43, namely a radial bearing, is mounted rigidly on the bearing element 42 and ensures that the spindle 29 can rotate around a well-defined axis. The bearing element 42 furthermore comprises an axial bearing 45, which is supported on one side by a ring 44 positioned in the bearing element 42 and, on the other side, is supported in the axial direction by a nut 46 mounted on the spindle 29. Since the bearing element 42 is connected tightly to the brake lever 2, the axial force from the spindle 29 can be supported axially by the brake lever 2 and is thus not transferred to the drive 18. The combined bearing system with a radial bearing 43 and an axial bearing 45 is only depicted here by way of example. Instead of this arrangement, other bearings or bearing combinations can also be used, such as angular ball bearings. On the drive side, the spindle 29 is connected to a spindle extension 34 via a bellows coupling 32, which transfers the rotational movement of the motor 18.

The overrun brake 38 moreover comprises a spring element 47 that produces, in the unactuated state of the overrun brake 38, clearance between the brake lining 41 and the bearing element 42, so that the friction lining 41 does not rub against the bearing element during a rotation of the spindle 29.

FIG. 9 moreover shows a second stop 39, which limits the movement of the slide 8 in the direction of the drive 18. The stop 39 is connected rigidly to one of the brake levers 2. According to a preferred embodiment, the stop 39 is elastically supported, so that the impact of the slide 8 (or the nut 28) can be absorbed.

In the normal operation, the stop 39 and the lining holder 40 are mounted with a small separation distance. As soon as the slide 8 (or the nut 28) runs up against the stop 39, the latter is bent and presses against the lining holder 40. If the spindle 29 is now driven further, the slide 8 presses even harder against the stop 39, whereby the overrun brake 38 brakes more, and thus the drive motion is decelerated and stopped.

According to a specific embodiment of the invention, the stop 27 and/or 39 can be used as a reference element for determining the position of the slide 8. A switching contact (not shown) can, for example, be installed on at least one of the stops 27 or 39, said contact generating a signal as soon as the slide 8 is moved against the corresponding stop 27, 39. Alternatively, the position of the slide 8 on one of the stops 27, 39 could also be detected without using a sensor by a current or power measurement in the drive 18.

The friction brake 1 depicted in the figures is in particular intended to brake rail-guided transportation devices. If the transportation device moves, it is possible for the brake linings 6, in the open state of the friction brake 1, to strike the guide rail arranged there between (not shown) or to rub against it. The friction brake therefore preferably comprises a U-shaped lining guide 50, in which a bearing surface 35 is mounted on both sides of the U, as is depicted in FIG. 10. The U-shaped lining guide 50 is configured in such a way that it surrounds the guide rails or the braking element (not shown). In the exemplary embodiment from FIG. 4, the lining guide 50 is so mounted between both brake levers 2 via the screws 37 that some axial displacement is allowed, wherein the screws 37 are pre-loaded by the springs 36 that are supported on the brake lever 2. The springs 36 thus preferably have a force/displacement characteristic that is steeper than that of the spring elements 11. If the transportation device, and thus also the friction brake 1, is now deflected laterally relative to the guide rail, the bearing surfaces 35 are pressed against the guide rail. Thus the lining guide 50 is pressed against the corresponding springs 36. Due to the elastic force of the springs 36 acting in the opposite direction, the lining guide 50 is moved back to a central position between the brake levers 2. Thus a brake lining 6 that is striking or rubbing against the guide rail is moved away from the guide rail. This means that a clearance distance (the same size on both sides) is reestablished between the guide rail and the linings 6. Vibrations or lateral impacts can also be absorbed by means of the lining guide 50.

Instead of the two bearing surfaces 35, the lining guide 50 can also be equipped with a one-piece bearing surface, preferably formed in a U-shape adapted to the lining guide 50.

The invention claimed is:

1. A friction brake (1), in particular for elevators, comprising at least two brake levers (2) that each have a brake lining (6) and are arranged opposite each other in the form of a caliper, wherein at least one brake lever (2) is pivotally mounted, and an actuator (5) for actuating the brake levers (2), which is configured in such a way that the force ($F_A$) exerted by the actuator (5) acts substantially perpendicular to a clamping force ($F_Z$) exerted by the brake levers (2), and a spreading mechanism (9, 26), which can be acted on by the actuator (5) in order to regulate the clamping force ($F_Z$), wherein the spreading mechanism (9, 26) comprises a roller unit (9) that is controlled by an actuator (5), said roller unit having a first roller (21) that rolls on a first surface (10) provided on the first brake lever (2), and a second roller (22) that rolls on a second surface (48) provided on the second brake lever (2), wherein the rollers (21, 22) rotate around the same axis of rotation.

2. The friction brake (1) according to claim 1, wherein the actuator (5) is mounted on a carrier element (4).

3. The friction brake (1) according to claim 1, wherein the actuator (5) is arranged at least partially between the brake levers (2).

4. The friction brake (1) according to, claim 1 wherein the spreading mechanism (9, 26) comprises a wedge mechanism.

5. The friction brake (1) according to claim 4, wherein the wedge mechanism (9, 26) comprises at least one wedge element that is fastened to a brake lever (2).

6. The friction brake (1) according to claim 1, wherein the spreading mechanism (9, 26) is arranged between the brake levers (2).

7. The friction brake (1) according to claim 1, wherein the actuator (5) comprises a nut-spindle-unit (7), which drives a roller unit (9) in the operating direction ($F_A$) of the actuator (5).

8. The friction brake (1) according to claim 1, wherein the brake levers (2) are pivotally mounted by means of a solid state hinge (12).

9. The friction brake (1) according to claim 8, wherein the solid state hinge (12) has at least one strut (15) that twists during a pivoting movement of a brake lever (2).

10. The friction brake (1) according to claim 1, wherein a spring arrangement (11) is provided, which pre-loads the brake levers (2) in the clamping direction.

11. The friction brake (1) according to claim 10, wherein the actuator (5) is configured to be non-self-locking, such that the friction brake (1) is closed automatically by the spring arrangement (11) in the case of a defect such as a loss of power.

12. The friction brake (1) according to claim 1, wherein the actuator (5) comprises an overrun brake (38) that automatically brakes a rotational movement of the actuator (5) when a roller unit (9) driven by the actuator (5), or a slide (8) containing the roller unit (9), runs up against a stop (27, 39).

13. The friction brake (1) according to claim 12, wherein the overrun brake (38) comprises a lining holder (40) fastened on a spindle (2) and a bracket (42) fastened on a brake lever (2), against which a brake lining (41) fastened on the lining holder (40) presses.

14. The friction brake (1) according to claim 1, wherein an elastically-suspended lining guide (50) is provided between the brake levers (2), said guide being automatically centered between the brake levers (2), thus setting an equal distance from both brake linings (6) to a braking element arranged between the brake levers (2).

* * * * *